United States Patent
Moon et al.

(10) Patent No.: US 12,513,632 B2
(45) Date of Patent: Dec. 30, 2025

(54) TIME SENSITIVE COMMUNICATION SUPPORT INFORMATION UPDATING METHOD AND DEVICE IN MOBILE COMMUNICATION SYSTEM

(71) Applicant: Samsung Electronics Co., Ltd., Suwon-si (KR)

(72) Inventors: Sangjun Moon, Suwon-si (KR); Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 17/787,768

(22) PCT Filed: Dec. 23, 2020

(86) PCT No.: PCT/KR2020/018974
§ 371 (c)(1),
(2) Date: Jun. 21, 2022

(87) PCT Pub. No.: WO2021/141295
PCT Pub. Date: Jul. 15, 2021

(65) Prior Publication Data
US 2023/0068462 A1    Mar. 2, 2023

(30) Foreign Application Priority Data
Jan. 6, 2020   (KR) .................. 10-2020-0001735

(51) Int. Cl.
*H04W 56/00* (2009.01)
*H04J 3/06* (2006.01)

(52) U.S. Cl.
CPC ......... *H04W 56/001* (2013.01); *H04J 3/0685* (2013.01)

(58) Field of Classification Search
CPC .............. H04W 56/00; H04W 56/001; H04W 56/0015; H04W 28/02; H04J 3/0685;
(Continued)

(56) References Cited

U.S. PATENT DOCUMENTS 11,140,695 B1 * 10/2021 Eyuboglu ........... H04W 72/535
2019/0289616 A1   9/2019 Hampel et al.
(Continued)

FOREIGN PATENT DOCUMENTS

CN   110213007 A  *  9/2019 ............ H04J 3/0638
CN   110535552 A  * 12/2019 ............ H04J 3/0638
(Continued)

OTHER PUBLICATIONS

Nokia et al., 'TSCAI granularity', S2-1912597, 3GPP TSG-SA2 Meeting #136, Reno, Nevada, United States, Nov. 22, 2019.
(Continued)

*Primary Examiner* — Sujoy K Kundu
*Assistant Examiner* — Vladislav Y Agureyev
(74) *Attorney, Agent, or Firm* — Jefferson IP Law, LLP

(57) ABSTRACT

The present disclosure relates to a 5G or pre-5G communication system to be provided for supporting a data transmission rate higher than that of a 4G communication system such as LTE. The method according to the present disclosure is a time synchronization method for transmitting time sensitive networking (TSN) data in a session management function (SMF) device of a mobile communication system, and may comprise a step of determining a time interval for updating time sensitive communications assistance information (TSCAI), and providing the determined time interval to respective nodes of the mobile communication system.

8 Claims, 11 Drawing Sheets

(58) Field of Classification Search
CPC ... H04J 3/12; H04J 3/14; H04J 3/0667; H04L 47/28; H04L 7/0008; H04L 7/0033
See application file for complete search history.

(56) References Cited

U.S. PATENT DOCUMENTS

| | | | | |
|---|---|---|---|---|
| 2020/0120536 | A1* | 4/2020 | Prakash | H04W 72/12 |
| 2020/0137615 | A1* | 4/2020 | Joseph | H04W 28/0257 |
| 2020/0229206 | A1* | 7/2020 | Badic | G05D 1/225 |
| 2020/0412813 | A1* | 12/2020 | Mong | B61L 15/0036 |
| 2021/0105192 | A1* | 4/2021 | Kahn | H04L 41/5009 |
| 2021/0243641 | A1* | 8/2021 | Gangakhedkar | H04L 12/1407 |
| 2021/0273736 | A1* | 9/2021 | Li | H04W 76/12 |
| 2022/0006549 | A1* | 1/2022 | Wang | H04W 56/001 |
| 2022/0014296 | A1* | 1/2022 | Wang | H04W 56/001 |
| 2022/0014981 | A1* | 1/2022 | Pedersen | H04W 36/0072 |
| 2022/0030460 | A1* | 1/2022 | Wang | H04L 47/28 |
| 2022/0030641 | A1* | 1/2022 | Wang | H04W 40/02 |
| 2022/0053381 | A1* | 2/2022 | Xiong | H04W 28/0236 |
| 2022/0053509 | A1* | 2/2022 | Bulakci | H04W 28/0268 |
| 2022/0255871 | A1* | 8/2022 | Rost | H04L 67/60 |
| 2022/0263743 | A1* | 8/2022 | Gebert | H04W 76/15 |
| 2022/0330183 | A1* | 10/2022 | Minokuchi | H04W 56/001 |
| 2022/0338142 | A1* | 10/2022 | Minokuchi | H04J 3/12 |
| 2023/0042506 | A1* | 2/2023 | Kahn | H04W 28/0278 |
| 2023/0379385 | A1* | 11/2023 | Mong | H04L 45/66 |
| 2024/0356687 | A1* | 10/2024 | Speicher | H04J 3/0667 |

FOREIGN PATENT DOCUMENTS

| | | | | |
|---|---|---|---|---|
| CN | 110611924 | A * | 12/2019 | H04L 45/3065 |
| CN | 110636547 | A * | 12/2019 | H04L 47/28 |
| CN | 110809295 | A * | 2/2020 | H04L 47/2416 |
| CN | 112823498 | A * | 5/2021 | H04W 72/12 |
| CN | 114450916 | A * | 5/2022 | H04J 3/12 |
| EP | 4037244 | A1 * | 8/2022 | H04J 3/12 |
| WO | WO-2021048904 | A1 * | 3/2021 | H04J 3/0667 |

OTHER PUBLICATIONS

Samsung et al., 'Key issue on QoS Enhancement for Deterministic Applications in 5GS', S2-1911960, SA WG2 Meeting #136, Reno, USA, Nov. 19, 2019.
Tencent, 'Update the TSN Time Drift Threshold', S2-1911539, SA WG2 Meeting #136, Reno USA, Nov. 8, 2019.
Huawei, 'Update of Key Issue #4 on TSN supporting', S6-192174, 3GPP TSG-SA WG6 Meeting #34, Reno, Nevada US, Nov. 4, 2019.
3GPP TS 23.501 V16.2.0 (Sep. 2019) 3rd Generation Partnership Project; Technical Specification Group Services and System Aspects; System Architecture for the 5G System (5GS); Stage 2 (Release 16), Sep. 24, 2019.
European Summons to attend oral proceedings pursuant to Rule 115(1) EPC dated Feb. 27, 2025, issued in a European Patent Application No. 20 912 849.5-1206.
European Office Action dated Oct. 8, 2025, issued in European Patent Application No. 20912849.5.

* cited by examiner

TIME SENSITIVE COMMUNICATION SUPPORT INFORMATION UPDATING METHOD AND DEVICE IN MOBILE COMMUNICATION SYSTEM

TECHNICAL FIELD

The disclosure relates to a method and device for supporting time-sensitive networking (TSN) and, particularly, to a method and device for providing clock synchronization between mobile communication terminals interworking with a wired network.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Compared to the existing 4G system, the 5G system is considering support for various services. For example, as representative services, there are an enhanced mobile broad band (eMBB) service, an ultra-reliable and low-latency communication (URLLC) service, a massive machine type communication (mMTC) service, an evolved multimedia broadcast/multicast service (eMBMS), and the like. In addition, a system providing the URLLC service may be referred to as a URLLC system, and a system providing the eMBB service may be referred to as an eMBB system. Also, the terms service and system may be used interchangeably.

Among them, the URLLC service is a service newly considered in the 5G system, unlike the existing 4G system, and requires satisfaction of ultra-high reliability (e.g., a packet error rate of about 10-5) and low latency (e.g., about 0.5 msec) conditions compared to other services. In order to satisfy such strict requirements, the URLLC service may need to apply a transmission time interval (TTI) shorter than the eMBB service, and various operating schemes using this are being considered.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

Meanwhile, in a mobile communication network, time-sensitive networking (TSN) is being discussed. Such TSN is expected to be mainly used in fields such as audio/video or factory automation.

DISCLOSURE OF INVENTION

Technical Problem

When transmitting time-sensitive networking (TSN) traffic information to a mobile communication network, for example, 3GPP Network, as time-sensitive communication assistance information (TSCAI), an update reflecting a difference between 5G clock and TSN clock is required. In particular, the lower the latency requirement of TSN traffic, the more frequently TSCAI update is required. Thus, a load for signaling in the 3GPP network may occur.

The disclosure provides a method and device capable of reducing a signaling load upon TSCAI update in consideration of other characteristics of TSN traffic.

Solution to Problem

According to an embodiment of the disclosure, a time synchronization method for transmission of time sensitive networking (TSN) data in a session management function (SMF) device of a mobile communication system may include receiving data transmission parameters from a TSN centralized network configuration server, the data transmission parameters including latency requirements, periodicity, and survival time; determining a first time interval for updating time sensitive communications assistance information (TSCAI), based on a difference between a first period for transmitting the TSN data based on a TSN reference clock and a second period for transmitting the TSN data based on a reference clock of the mobile communication system; identifying whether or not to update the first time interval, based on the received parameters; updating the first time interval to a second time interval longer than the first time interval, based on the received parameters, in case that the first time interval needs to be updated as an identifying result; determining the first time interval or the second time interval as a default time interval for updating the TSCAI, based on whether or not to update; and transmitting the default time interval to nodes transmitting the TSN data in the mobile communication system.

According to an embodiment of the disclosure, a session management function (SMF) device for controlling a synchronization of time sensitive networking (TSN) data in a mobile communication system transmitting the TSN data includes a network interface communicating with nodes of the mobile communication network and a TSN node; a memory storing information for the synchronization of the TSN data; and at least one processor.

The at Least One Processor May Control to:

receive data transmission parameters from a TSN centralized network configuration server through the network interface, the data transmission parameters including latency requirements, periodicity, and survival time, determine a first time interval for updating time sensitive communications assistance information (TSCAI), based on a difference between a first period for transmitting the TSN data based on a TSN reference clock and a second period for transmitting the TSN data based on a reference clock of the mobile communication system, identify whether or not to update the first time interval, based on the received parameters, update the first time interval to a second time interval longer than the first time interval, based on the received parameters, in case that the first time interval needs to be updated as an identifying result, determine the first time interval or the second time interval as a default time interval for updating the TSCAI, based on whether or not to update, and transmit the default time interval to nodes transmitting the TSN data in the mobile communication system through the network interface.

Advantageous Effects of Invention

In a general TSCAI update method, the lower the latency requirement of TSN traffic, the more frequent TSCAI update is required, resulting in a signaling load in the 3GPP network. In case of applying the method and device according to the disclosure, there is an advantage in that it is not necessary to frequently update TSCAI even if the latency requirement of TSN traffic is low, thereby reducing the occurrence of signaling load.

MODE FOR THE INVENTION

Hereinafter, the disclosure will be described in detail with reference to the accompanying drawings. In the following description of the disclosure, if it is determined that a detailed description of a related well-known function or configuration may unnecessarily obscure the subject matter of the disclosure, the detailed description thereof will be omitted. In addition, terms used herein are defined in consideration of functions in the disclosure and may vary according to a user's or operator's intention or custom. Thus, the definition should be made based on the content throughout this specification.

In the following description, terms for identifying access nodes, terms referring to network entities, terms referring to messages, terms referring to interfaces between network entities, and terms referring to various kinds of identification information are for convenience of description. Therefore, the disclosure is not limited to such terms, which may be replaced with other terms referring to objects having equivalent technical meanings.

For convenience of description, the disclosure uses terms and names defined in the 5GS and NR standards, which are the latest standards defined by the 3rd Generation Partnership Project (3GPP) organization among communication standards that currently exist. However, the disclosure is not limited by such terms and names and may be equally applied to a wireless communication network that conforms to other standards. In particular, the disclosure is applicable to 3GPP 5GS/NR (5th generation mobile communication standard).

TSN, which is an abbreviation of Time Sensitive Networking, is a set of various standards related to time synchronization for supporting audio/video or factory automation, to low latency support, to resource management, and to reliability improvement. Schemes of supporting the TSN in the 3GPP network are being proposed.

Figure 1:
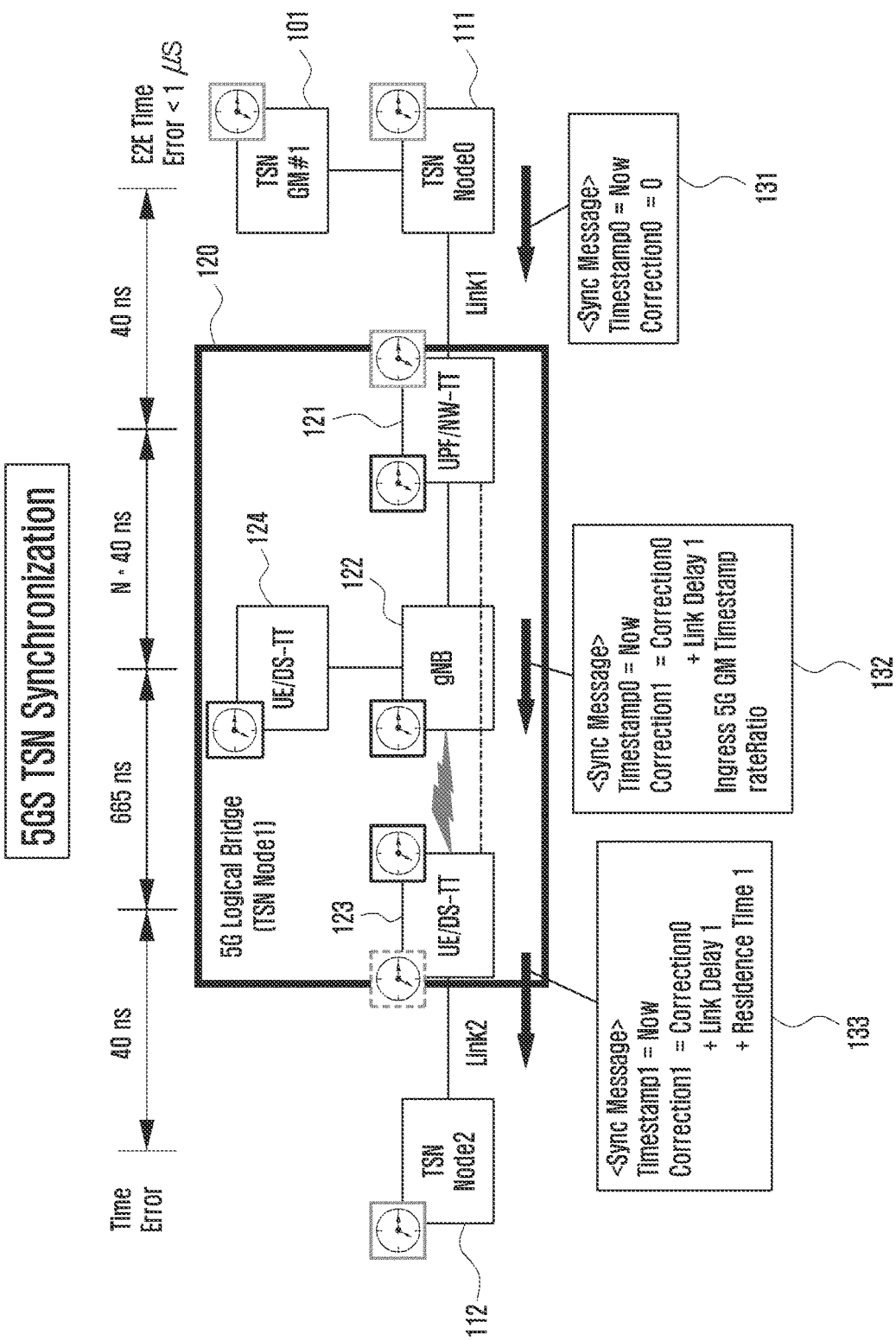
FIG. 1 is an exemplary diagram conceptually illustrating a TSN synchronization support process through a 3GPP network.

FIG. 1 is an exemplary diagram conceptually illustrating a TSN synchronization support process through a 3GPP network.

Before description with reference to FIG. 1, in order to support time synchronization in a wired network TSN, each TSN node may transmit a synchronization frame in which a time stamp is added based on a TSN grand master (GM) clock. In the example of FIG. 1, the GM clock may be provided from a specific node such as TSN GM #1 101. Then, TSN node0 111 may add the GM clock received from the TSN GM #1 101 as a time stamp and transmit a synchronization message or synchronization frame to the next node. As such, a TSN node that has received the synchronization message or synchronization frame may reflect a link propagation delay and a residence time, which is a delay time in its own node, in a correction field of the synchronization frame, and transmit it to the next TSN node. Through this process, all TSN nodes can achieve time synchronization based on the TSN GM clock.

Meanwhile, in order to support such TSN synchronization in the 3GPP network, a scheme in which the 3GPP network operates as one TSN node has been proposed. In this scheme, all of UE, gNB (RAN, base station), and UPF in the 3GPP network should be synchronized to the 5G GM clock. It is assumed that for this purpose, the RAN is connected to the 3GPP GM, and the UPF connected to the RAN via the wired network is also synchronized with the 5G GM clock by using the wired network TSN synchronization scheme or any other scheme.

In the 3GPP network, the RAN and the UE are connected through the 5G air protocol. In this process, the RAN should further provide several functions so as to precisely support synchronization with the UE (e.g., a time error less than 656 ns). Such functions to be further provided may include accurate timing delivery by RRC/SIB, finer timing advance (TA) granularity, propagation delay compensation, and the like.

Now, the constitution shown in FIG. 1 will be described, and then operations according to FIG. 1 will be described.

With reference to FIG. 1, the GM clock may be provided from a specific node for providing the GM clock, such as a TSN GM #1 101 in the example of FIG. 1, to at least one TSN node existing on the TSN wired network. FIG. 1 exemplarily shows a case where the GM clock is provided from the TSN GM #1 101 to a TSN node0 111. Also, the next node may be a 5G network 120 in the example of the 3GPP network. It is exemplified that a first link (Link 1) is established between the TSN node0 111 and the 5G network 120. Therefore, the TSN node0 111 may generate a synchronization message or synchronization frame 131 by using the GM clock provided by the TSN GM #1 101 as a timestamp and then provide it to the 5G network 120 which is the next node. The 5G network 120 may process this to generate a synchronization message or synchronization frame 133 and deliver it to the next TSN node, a TSN node2 112, through a second link (Link 2).

Then, the internal constitution of the 5G network 120 will be briefly described with reference to FIG. 1. A user plane function (UPF) 121 exemplified as a node of the 5G network 120 that receives a synchronization message or synchronization frame through the first link with the TSN node0 111, which is the first node, may serve as a gateway for delivering packets transmitted and received by UE 123 or 124. The UPF 121 may be a PDU session anchor (PSA) UPF serving as an anchor of a PDU session connected to a data network. All data sent by the UE to the data network may be delivered through this anchor UPF.

In addition, the UPF 121 may include a network side TSN translator (NW-TT) for the operation of the TSN network. The NW-TT may be in charge of some functions of Ethernet-related protocols required for the 5GS to support the TSN, and it may perform synchronization frame interpretation and processing, port information management, neighboring node information collection and management through link layer discovery protocol (LLDP), and the like.

Hereinafter, in all embodiments according to the disclosure, it will be described assuming that the UPF 121 includes the NW-TT, unless specifically stated that it does not include the NW-TT.

The UPF 121 may generate a new synchronization message or synchronization frame 132 by adding information such as link delay and propagation delay to the synchronization message or synchronization frame 131 received from the TSN node0 111 as described above, and deliver it to a base station (gNB) 122 in the 5G network 120. In this case, the base station 122 and the UPF 121 may be connected by wire, and at least one other network function device may be included therebetween.

The base station 122 may add information such as link delay and propagation delay to the synchronization message or synchronization frame received from the UPF 121 and provide it to the UE 123. In this case, as well known, a message or frame may be transmitted between the base station 122 and the UE 123 through a radio channel.

Therefore, the UE 123 may generate the synchronization message or synchronization frame 133 by including information such as propagation delay and link delay in the synchronization message or synchronization frame received from the base station 122 and provide it to the TSN node2 112. In this case, the UE 123 and the TSN node2 112 may be connected by wire, and the synchronization message or synchronization frame may be transmitted through the second link (Link 2).

Based on the above, a process of synchronization in a downlink direction will be described.

The downlink may be a case in which data is transmitted from a TSN node to the final TSN node through the 3GPP network and the UE. In FIG. 1, the direction from the TSN node0 111 to the TSN node2 112 will be referred to as the downlink.

In a state that all entities or nodes in the 3GPP network are synchronized with the 5G GM clock, when the UPF 121 receives a synchronization frame, it may include an ingress time stamp based on the 5G GM in the synchronization frame or synchronization message 132. In addition, the UPF 121 may put a link delay that has been measured/calculated and managed with the TSN node0 111 that transmitted the synchronization frame or synchronization message in the synchronization frame or synchronization message 132, and transmit it to the gNB 122, which is the next node in the 5G network. Then, the gNB 122 may forward it to the UE 123.

Upon receiving the synchronization frame or synchronization message from the gNB 122, the UE 123 may calculate a time to transmit it to the TSN node2, which is an external TSN node, based on the 5G GM clock, calculate a difference from an ingress time, and reflect it in the correction field as a residence time, thereby completing the TSN synchronization operation. The synchronization message or synchronization frame 133 generated as above may be provided to the TSN node2 112.

Next, synchronization in an uplink direction will be described. The uplink may be a case in which data is transmitted from the final TSN node in case of the downlink to the 3GPP core network through the UE of the 3GPP network to control the TSN node or to transmit data of the TSN node. In FIG. 1, the direction from TSN node2 112 to TSN node0 111 will be referred to as the uplink.

For uplink synchronization, the UE 123 may put, in the synchronization frame, an ingress time, which is the 5G GM based time at which the synchronization frame is received from the TSN node2 112 which is the previous TSN node, and a link delay with the TSN node2 112, and transmit it to the UPF 121 through the gNB 122. Then, the UPF 121 may calculate a time to transmit it to the TSN node0 111, which is an external TSN node, based on the 5G GM clock, calculate a difference from the ingress time, and reflect it in the correction field as a residence time. Through this process, the 3GPP network can keep the TSN synchronization time error less than 1 µs.

Figure 2:
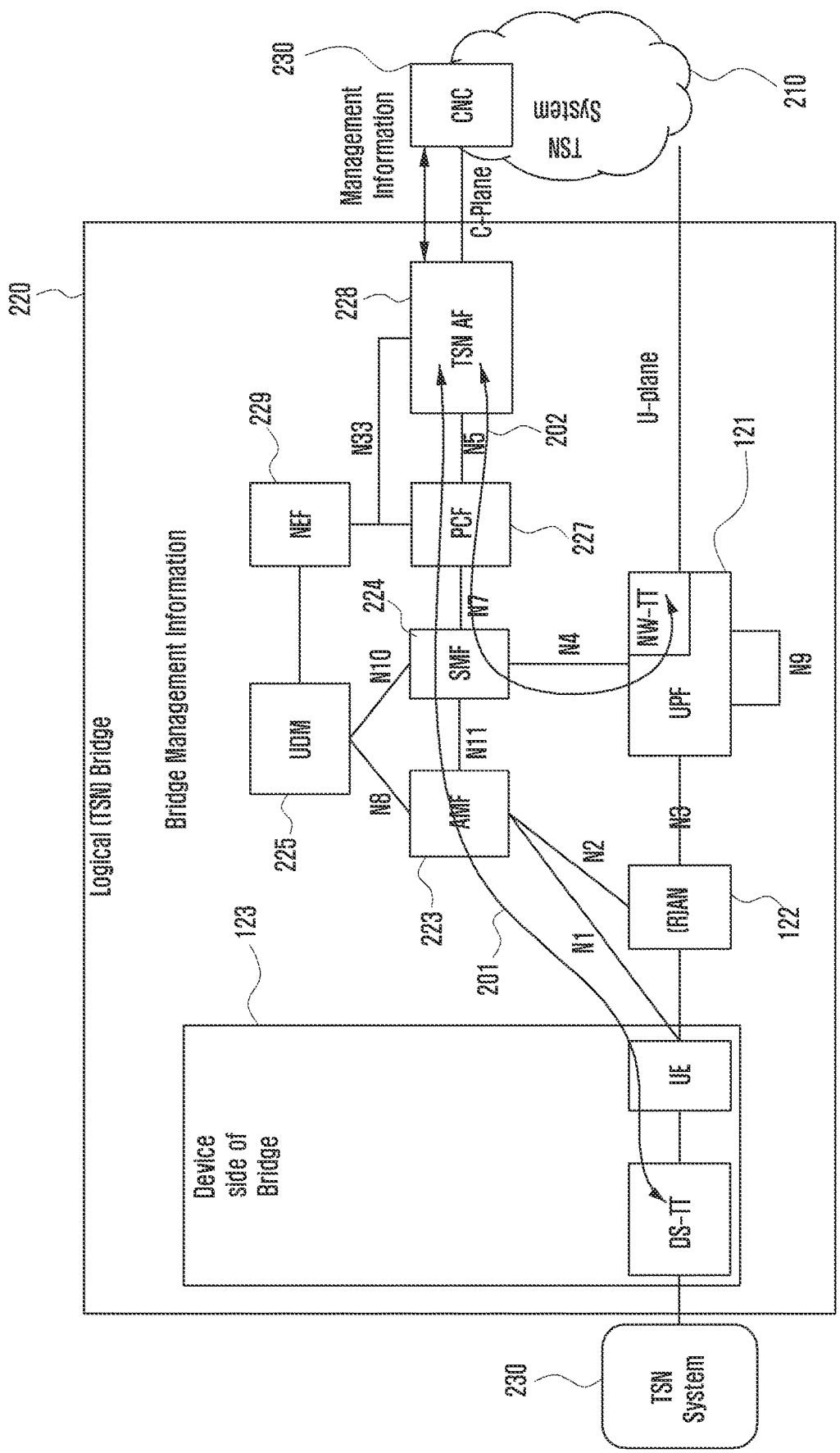
FIG. 2 is an exemplary diagram illustrating the structure of a 3GPP network and transmission of information when 5GS supports TSN in the centralized model of TSN.

FIG. 2 is an exemplary diagram illustrating the structure of a 3GPP network and transmission of information when 5GS supports TSN in the centralized model of TSN.

With reference to FIG. 2, a second TSN system 210 may include a centralized network configuration (CNC) server 230. Also, a wireless communication network 220 may operate as one TSN bridge. The wireless communication network may be the 3GPP network as described above, and in particular, a network according to the 5G or NR standard. However, the disclosure is not limited to the above, and any other wireless network may be equally applied if it includes the functions described in the disclosure.

Exemplarily shown in FIG. 2 is a case that the wireless communication network 220 is located between the second TSN system 210 and the first TSN system 230 and operates as one TSN bridge. The core network of 5G may consist of the following network functions. Each of the network functions may be one network node. One network node may take a form that is physically and/or logically independent, and may be formed together with any other specific node. Also, each of the network functions may be implemented by a specific device. In another example, each of the network functions may be implemented in a form in which a device and software are combined. In still another example, each of the network functions may be implemented in software in a device on a specific collective network. Hereinafter, each network function will be denoted as a "function device". Now, the network functions of the core network of 5G will be described.

The wireless communication network 220 may include the UE 123 of the bridge, and in case of the 3GPP network, it may include a user equipment (UE) and a device side TSN translator (DS-TT). The DS-TT may be referred to as a TSN converter, may be implemented with physical hardware, and may be driven in an application of the UE or in a communication processor (CP). In another example, the DS-TT may have separate hardware and be controlled by an application of the UE or a lower layer of the application. The DS-TT may be in charge of some functions of Ethernet-related protocols required for the 5GS to support the TSN, and it may perform synchronization frame interpretation and processing, port information management, neighboring node information collection and management through link layer discovery protocol (LLDP), and the like. The UE 123 may be a device that includes a wireless communication unit (not shown in FIG. 2) for transmitting and receiving control signals and data to and from the 5G network, and a controller (usually an application processor, not shown in FIG. 2) for controlling the same.

The RAN 122 may be a base station of the 5G network. Although FIG. 2 illustrates the base station of the 5G network as RAN, the RAN may be the same component as gNB because the 5G standard calls it gNB. Therefore, hereinafter, gNB and RAN will be used interchangeably.

Accordingly, the UE 123 and the RAN 122 may transmit/receive data and control signals using a 5G radio channel. The user plane function (UPF) 121 may serve as a gateway for delivering packets transmitted and received by the UE 1223. The UPF 121 may be a PDU session anchor (PSA) UPF serving as an anchor of a PDU session connected to a data network. All data sent by the UE to the data network may be delivered through this anchor UPF. Data packets destined for the centralized data network or the Internet data network are delivered to the PSA UPF of the corresponding PDU session.

An access and mobility management function device (AMF) 232 may perform a network function of managing the mobility of the UE. A session management function device (SMF) 224 may perform a network function of managing a packet data network connection provided to the UE. This connection may be called a protocol data unit (PDU) session.

A policy and charging function device (PCF) 227 may perform a network function of applying a service policy, charging policy, and PDU session policy of a mobile communication operator with respect to the UE 123. A unified data management device (UDM) 224 may perform a network function of storing information about subscribers. A network exposure function device (NEF) 229 is accessible to information managing the UE 321 in the 5G network, and thus may perform a subscription to a mobility management event of the UE, a subscription to a session management event of the UE, a request for session-related information, a configuration of charging information of the UE, and a request to change the PDU session policy for the UE.

A case in which the 3GPP network 220 is modeled as a logical bridge using the above-described constitution of FIG. 2 will be described.

In the 3GPP network 220, the DS-TT/UE 123 and the NW-TT/UPF 121 may operate as input and output ports of the 5GS logical bridge, respectively, and transfer information of the corresponding port to the TSN AF 228. The TSN AF 228 may forward this aggregated information to the CNC server 230 of the TSN. The TSN AF 228 may configure 5GS bridge information by using the information received from the CNC 230. At this time, necessary information for each port may also be configured to use the same path. For example, the DS-TT/UE 123 may use a path, denoted by reference numeral 201, of the DS-TT/UE 123↔the gNB 122↔the AMF 223↔the SMF 224↔the PCF 227↔the TSN AF 228. In addition, the NW-TT/UPF 121 may use a path, denoted by reference numeral 202, of the NW-TT/UPF 121↔the SMF 224↔the PCF 227↔the TSN AF 228 so as to transmit necessary information to the TSN AF 228 or receive necessary information from the TSN AF 228 in the reverse direction. This process may be made by applying the PDU session establishment and modification procedure.

In case of exchanging management information with the TSN 210 by using the path of reference numeral 201 or the path of reference numeral 121 as described above, necessary bridge management information can be collected.

What will be described hereinafter in FIGS. 3, 4 and 5 relates to how, when the CNC 230 transmits information of TSN stream traffic to the 5GS logical bridge using the path described in FIG. 2, the 5GS internally converts it into time-sensitive communication assistance information (TS-CAI) and applies it as QoS.

Figure 3:
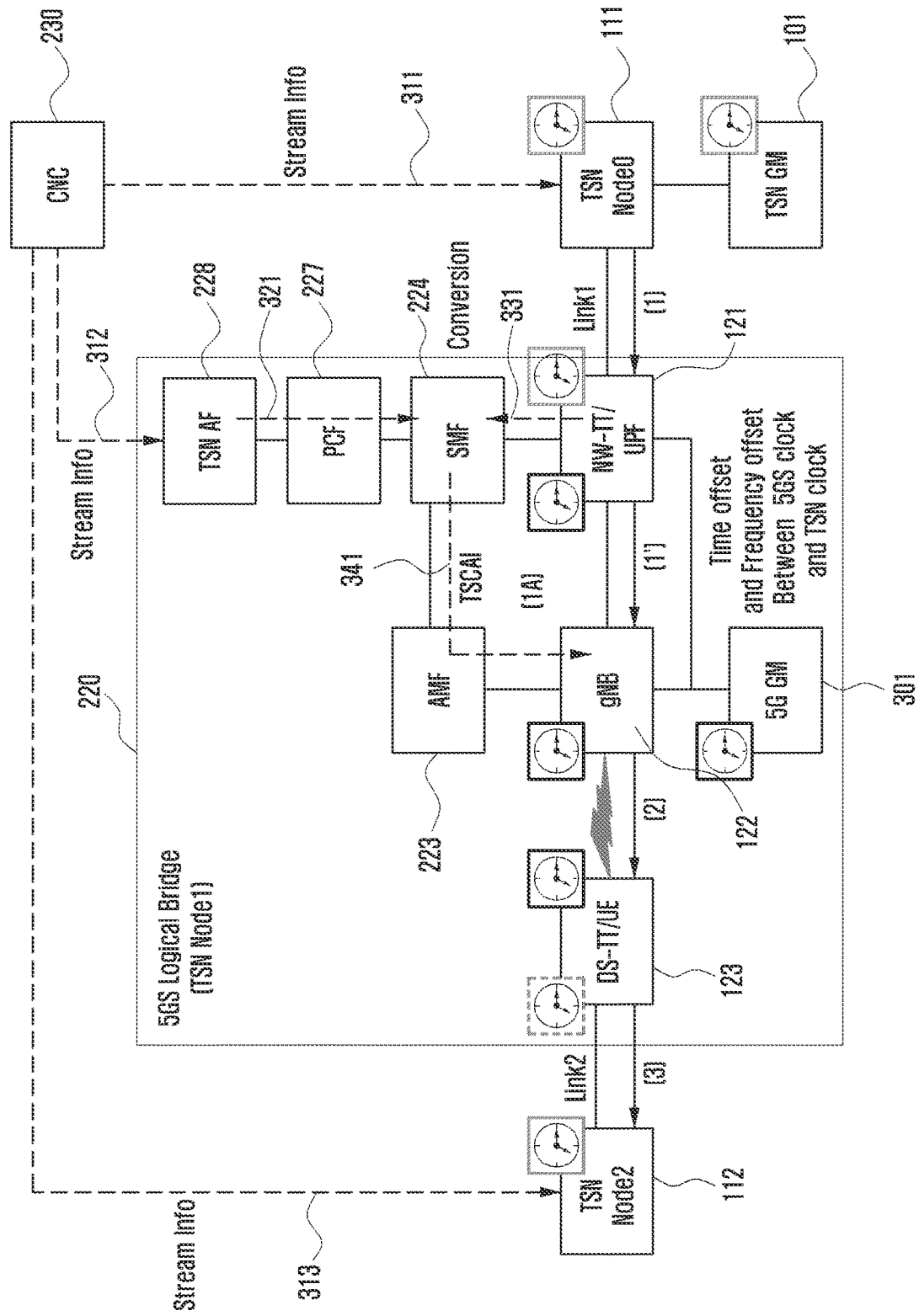
FIG. 3 is a diagram illustrating the constitution and signal flow of transmitting TSCAI when a TSN AF is not a TSN synchronization client according to the first embodiment of the disclosure.

FIG. 3 is a diagram illustrating the constitution and signal flow of transmitting TSCAI when a TSN AF is not a TSN synchronization client according to the first embodiment of the disclosure.

With reference to FIG. 3, the 5G network includes components using the same reference numerals as those described above and illustrated in FIGS. 1 and 2. Therefore, additional descriptions of the same components will be omitted. In FIG. 3, a 5G GM 301 is further illustrated. The 5G GM 301 may provide 5G time information to the gNB 122 and the NW-TT/UPF 121, based on the 5G GM clock.

The CNC 230 may acquire the constitution of the TSN network and scheduling capability of each bridge by collecting each bridge information as described above in FIG. 2. Therefore, based on the acquired information, the CNC 230 may determine which scheduling to transmit TSC traffic stream through which path, and provide the determined content to each of the bridges 111, 112, and 220. In this case, the 5G network 220 may provide the determined information to the TSN AF 228 configured for connection with the TSN network. Also, the determined information may be formed as stream information and transmitted as indicated by reference numerals 311, 312, and 313. For example, the CNC 230 may notify information about a schedule outputted from the TSN Node0 111 and a schedule outputted from the TSN Node1 220 with respect to a specific TSN stream to the 5GS Bridge through the TSN AF 228. This stream information may include information about a message transfer interval, each message size, and a transfer time of a specific message. Also, this stream information may be prepared based on the TSN GM clock provided by the TSN GM 101. The TSN AF 228 may transmit the stream information received from the CNC 230 to the SMF 224 as indicated by reference numeral 321.

The SMF 224 may convert the stream information received from the TSN AF 228, based on the 5GS GM clock. The SMF 224 may receive the 5GS GM clock, provided by the 5G GM 410, either from the UPF 121 or through the gNB 122 and the AMF 223. Therefore, based on the 5GS GM clock, the SMF 224 may perform conversion of the stream information received from the TSN AF 228. Thereafter, the SMF 224 may convert the stream transmitted from the TSN Node0 111 or the TSN Node2 112 with the arrival time of the gNB 122. The SMF 224 may convert arrival time information of a stream transmitted from a specific TSN node to the gNB into time-sensitive communications assistance information (TSCAI).

In FIG. 3, in case that the NW-TT/UPF 212 receives the 5G GM clock, it may determine, based on this information, a time offset and a frequency offset which are differences from the TSN GM clock. Thus, as indicated by reference numeral 331, the UPF 121 may provide the time offset and the frequency offset to the SMF 224.

Therefore, the SMF 224 may convert, based on the 5G GM clock, the stream information received from the TSN AF 228, and acquire the TSCAI by considering a delay time from the NW-TT/UPF 121 to the gNB 122. The TSCAI may be organized based on traffic arriving at the eNB 122, and may be composed of an arrival period of traffic burst (Periodicity), a size of traffic burst (Burst Size), and a time when a specific traffic burst arrives at the gNB 122 (Burst Arrival Time). The SMF 224 may transmit the TSCAI generated as above to the gNB 122 through a QoS configuration process as indicated by reference numeral 341. Accordingly, the gNB 122 may utilize the TSCAI information received from the SMF 224 in efficient radio resource scheduling.

For example, in case that information received from TSN Node0 111 in Link 1 shown in FIG. 3 is provided to the gNB 122 through the UPF 121, it may be utilized for radio resource scheduling based on the TSCAI information. In the same manner, a stream provided to the gNB 122 through Link2 between the TSN Node2 112 and the UE 123 may be utilized for radio resource scheduling based on the TSCAI information.

Figure 4:
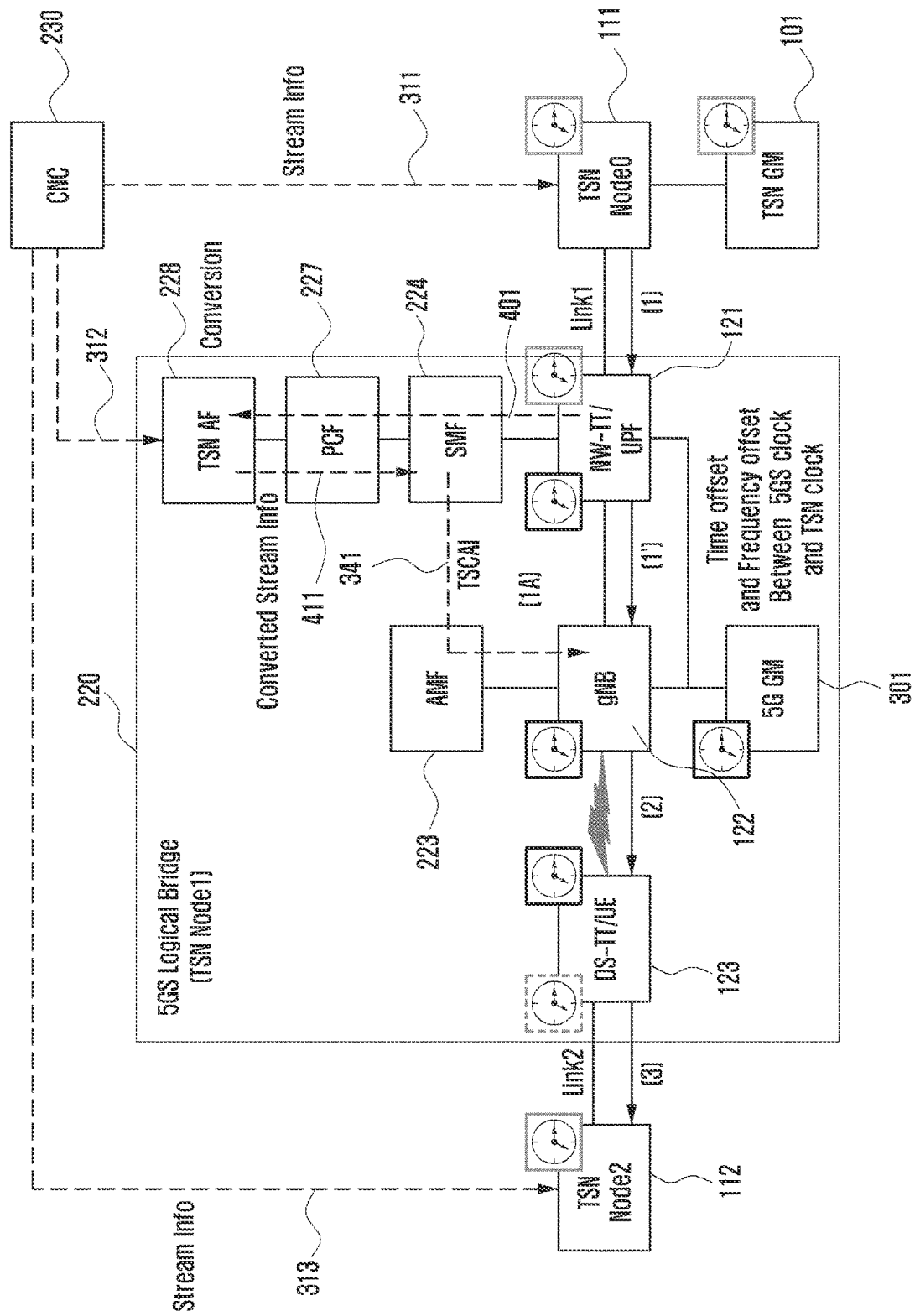
FIG. 4 is a diagram illustrating the constitution and signal flow of transmitting TSCAI when a TSN AF is not a TSN synchronization client according to the second embodiment of the disclosure.

FIG. 4 is a diagram illustrating the constitution and signal flow of transmitting TSCAI when a TSN AF is not a TSN synchronization client according to the second embodiment of the disclosure.

Before the description of FIG. 4, comparing it with FIG. 3, it can be seen that all components have the same form as in FIG. 3. Thus, the same components as those of FIG. 3 use the same reference numerals, and detailed descriptions of the same components and the same operations will be omitted.

Briefly describing the operation in FIG. 4, the TSN AF 228 may receive stream information from the CNC 230 as in FIG. 3 described above. This stream information is information based on the TSN GM clock.

In the second embodiment of the disclosure, the TSN AF 228 may change this information based on the 5GS GM clock and transmit it to the SMF 224. To this end, the NW-TT/UPF 121 should transmit the time offset and frequency offset, which are differences between the 5G GM clock and the TSN GM clock, to the TSN AF 228 via the SMF 224. Thereafter, the SMF 224 may generate the TSCAI in consideration of the delay time from the NW-TT/UPF 121 to the gNB 122. In this case, the TSN AF 228 may generate the TSCAI in consideration of the delay time from the NW-TT/UPF 121 to the gNB 122 and deliver it to the SMF 224. Thus, the SMF 224 may use the TSCAI generated by the TSN AF 228 as it is. The SMF 224 may deliver this TSCAI to the gNB 122 through the QoS configuration process. Accordingly, the gNB 122 may perform radio resource scheduling based on the TSCAI information.

Overall, the operation of FIG. 4 is different from the operation of FIG. 3 in that the UFP 121 receives the 5G GM clock from the 5G GM 301 and provides it to the TSN AF 228 as indicated by reference numeral 401. Also, the UPF 121 may provide the time offset and frequency offset that are differences between the 5G GM clock and the TSN GM clock. Therefore, when receiving stream information from the CNC 130, the TSN AF 228 may convert it to match the 5G GM. In addition, the TSN AF 228 may provide converted stream information to the SMF 224 as indicated by reference numeral 411. Thereafter, the operations of the SMF 224 and the gNB 122 may be performed in the same manner as described in FIG. 3.

Figure 5:
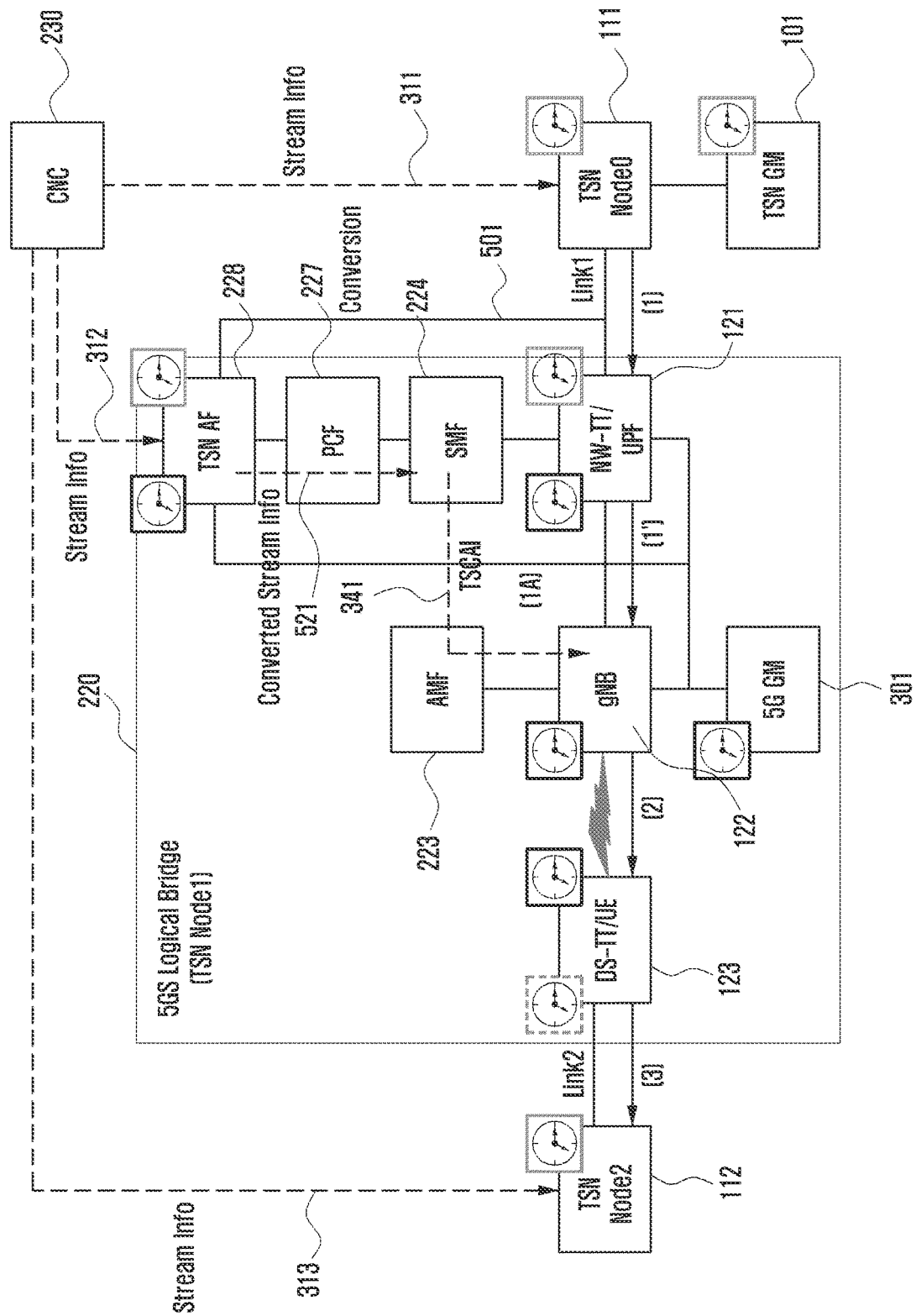
FIG. 5 is a diagram illustrating the constitution and signal flow of transmitting TSCAI when a TSN AF is a TSN synchronization client according to the third embodiment of the disclosure.

FIG. 5 is a diagram illustrating the constitution and signal flow of transmitting TSCAI when a TSN AF is a TSN synchronization client according to the third embodiment of the disclosure.

Before the description of FIG. 5, comparing it with FIGS. 3 and 4, it can be seen that all components have the same forms as in FIGS. 3 and 4. Thus, the same components as those of FIGS. 3 and 4 use the same reference numerals, and detailed descriptions of the same components and the same operations will be omitted.

With reference to FIG. 5, the TSN AF 228 may receive stream information from the CNC 130. This stream information is information based on the TSN GM clock. In FIG. 4, the TSN AF 228 converts this information based on the 5GS GM clock and transmits it to the SMF 224. However, in FIG. 5, unlike FIG. 4 described above, because of knowing information through a synchronization process with the 5G GM clock and the TSN GM clock, the TSN AF 228 may have already calculated and known the time offset and the frequency offset, which are the differences between the two clocks. Therefore, the TSN AF 228 may reflect the time offset and the frequency offset in the stream information received from the CNC 130 to convert it based on the 5G GM clock. This is possible because the TSN AF 228 is a TSN synchronization client and thus has the Link1 of reference numeral 501 with the TNS Node0 111, so that it is capable of knowing the TSN GM clock and the 5G GM clock. The TSN AF 228 may be in a state of having received the 5G GM clock through the UPF 121, the SMF 224, and the PCF 227 as described in FIG. 4. However, FIG. 5 does not illustrate such a reception path of the 5G GM clock. Therefore, as indicated by reference numeral 521, the TSN AF 228 may provide the SMF 224 with the stream information converted based on the 5G GM clock by reflecting the time offset and the frequency offset in the received stream information.

Thereafter, the SMF 224 may generate the TSCAI in consideration of the delay time from the NW-TT/UPF 121 to the gNB 122. In this case, the TSN AF 228 may generate the TSCAI in consideration of the delay time from the NW-TT/UPF 121 to the gNB 122 and deliver it to the SMF 224. Thus, the SMF 224 may use the TSCAI provided by the TSN AF 228 as it is. The SMF 224 may deliver this TSCAI to the gNB 122 through the QoS configuration process. Accordingly, the gNB 122 may perform efficient radio resource scheduling based on the TSCAI information.

Figure 6:
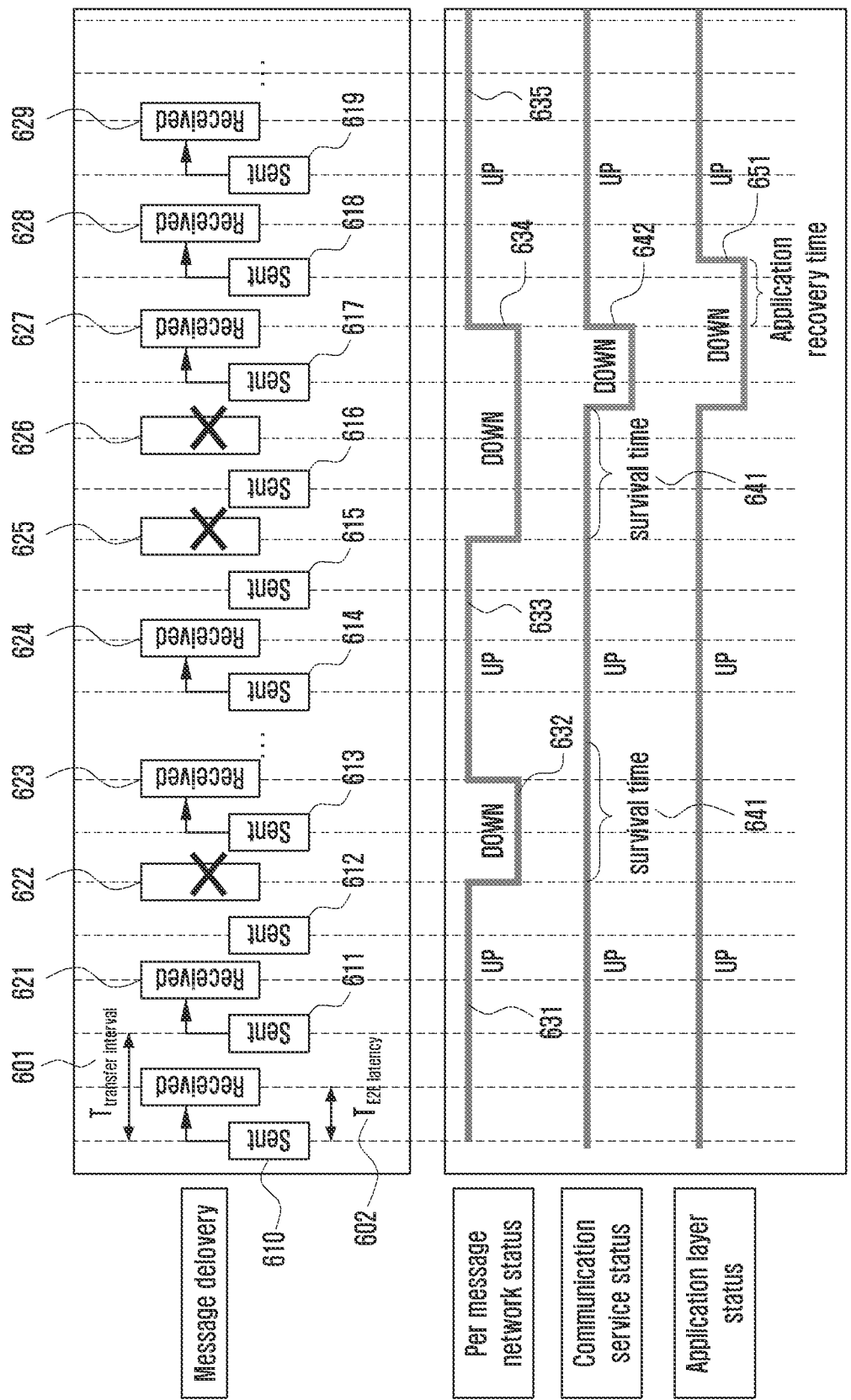
FIG. 6 is a conceptual timing diagram illustrating a survival time according to the disclosure.

FIG. 6 is a conceptual timing diagram illustrating a survival time according to the disclosure.

Before referring to FIG. 6, the following TSN network will be briefly described. Traffic for various types of time-sensitive networking (TSN) such as factory automation control/sensing signals has a characteristic in that messages of a small size (e.g., 20 to 50 bytes) are continuously transmitted at a certain transfer interval (e.g., 0.5 ms, 1 ms, 2 ms, etc.). Therefore, these small-sized messages are collectively called a stream. Between a producer (talker) and a consumer (listener) of such stream, a predetermined end-to-end (E2E) delay time (E2E latency) should be satisfied. Therefore, the consumer expects to receive a series of messages periodically. In this case, even if the message is not received at an expected time, i.e., a reception time of the message based on a configured period, there is a case that normal operation may be performed up to a predetermined time. The maximum time for normal operation even if a message is not received is referred to as a survival time. In case that the transfer interval of the message is shorter than the survival time, even if the message is lost within the survival time, that is, even if the message is not received, it may be determined that no abnormality has occurred in terms of application.

On the other hand, if the message is not be received beyond the survival time, it is determined that abnormality has occurred in terms of application as well, and it becomes a down state. Even if the message is normally received again in the down state, it may take a certain amount of time (application recovery time) to recover from the down state to an up state, which is a normal state, in terms of application.

This will be described with reference to FIG. 6. With reference to FIG. 6, the perspective of message transmission and reception related to message delivery is illustrated in the uppermost timing diagram.

With reference to the timing diagram regarding the perspective of message transmission and reception, a transmission side may send short messages 610, 611, 612, 613, 614, 615, 616, 617, 618, and 619 periodically in units of a preconfigured transfer interval 601. Therefore, a reception side may make attempts 620, 621, 622, 623, 624, 625, 626, 627, 628, and 629 to receive the short messages in units of the predetermined interval 601.

At this time, as illustrated in FIG. 6, a case in which transmission or reception of the third message 612 fails may occur. As indicated by 622, this case may be a case in which the reception side fails to receive the message. Also, in case that the 5G network operates as one TSN bridge node, the reception of two consecutive messages 624 and 625 may fail due to a sudden change in channel conditions or the like.

The second timing diagram of FIG. 6 shows a network status in units of messages. With reference to the second timing diagram, in case that the first message and the second message are normally received, the network status may be a normal (up) state as indicated by reference numeral 631. However, in case that reception or transmission of the third message fails, the network status may be an abnormal (down) state as indicated by reference numeral 633. Thereafter, when the message is normally received again, the network status may transition to the normal state as indicated by reference numeral 633.

Also, in case of continuously failing to receive messages such as the fifth and sixth messages, the network status may be the abnormal state for two intervals as indicated by reference numeral 634. In case of receiving a message normally again, the network status may transition to the normal state as indicated by reference numeral 635.

This will be described using the third timing diagram based on a communication service status.

In the third timing diagram, reference numeral 641 exemplarily indicates a case that the survival time is configured as a time longer than the transfer interval of the message. Therefore, in case that one message transmission or reception fails, that is, in case of failing to receive the third message 622 only and normally receiving the fourth message 623 within the survival time, the status of the application layer may maintain the normal state as shown in the last timing diagram.

On the other hand, in case of failing to receive two or more consecutive messages 625 and 626 for a time longer than the survival time, it exceeds the survival time 641, so that the communication service status may transition to the abnormal state as indicated by reference numeral 642.

In this case, it can be seen that, in the application layer, an additional time corresponding to the application recovery time is required as indicated by reference numeral 651 in addition to a mere time of the communication service status.

Figure 7:
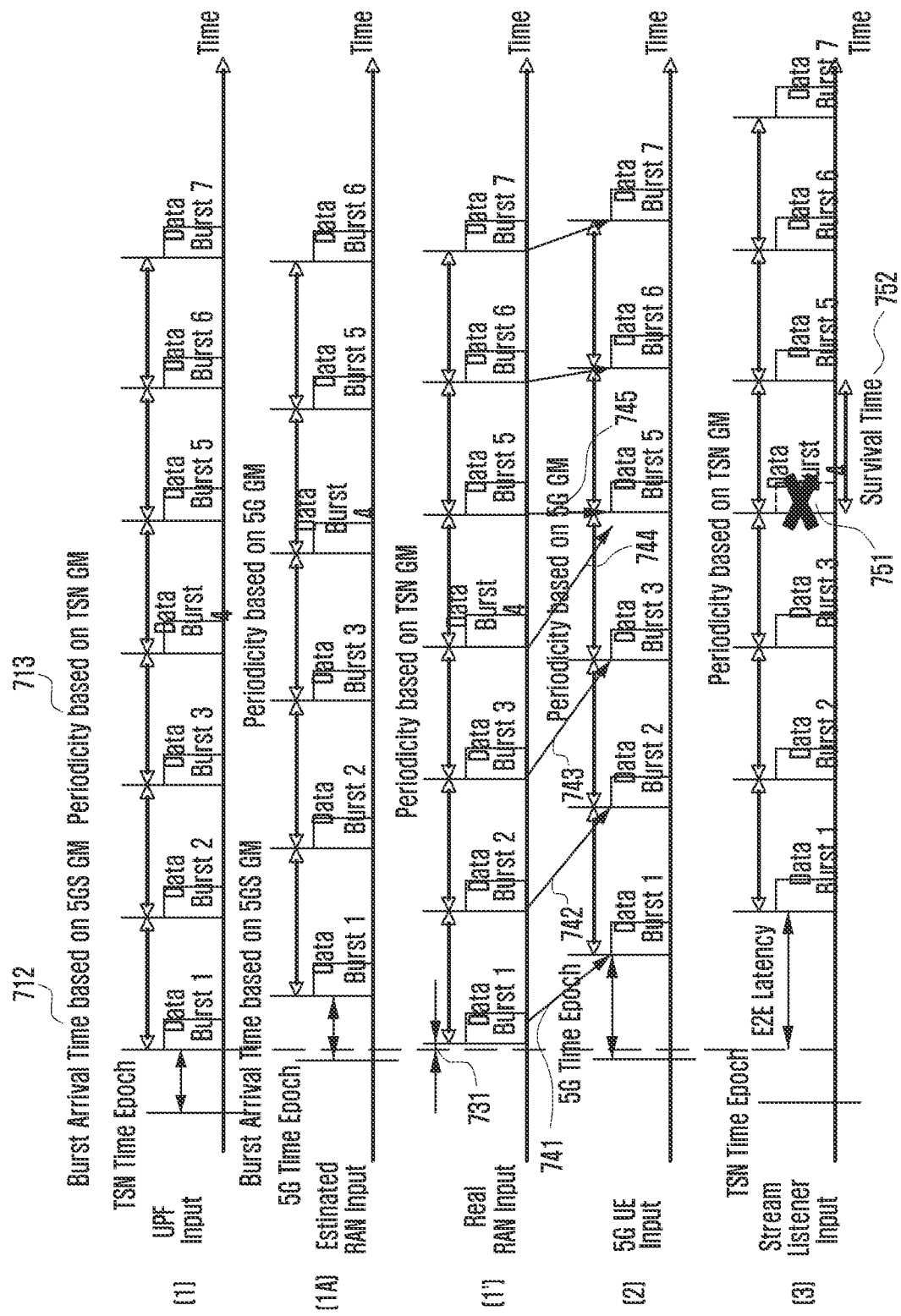
FIG. 7 is a timing diagram illustrating a time-sensitive communication (TSC) traffic pattern and a relationship between TSCAI and a survival time according to an embodiment of the disclosure.

FIG. 7 is a timing diagram illustrating a time-sensitive communication (TSC) traffic pattern and a relationship between TSCAI and a survival time according to an embodiment of the disclosure.

In describing FIG. 7, a timing diagram of a traffic pattern will be described assuming data 1 transmitted from the TSN Node0 111 through the Link1, data 1' processed by the UPF 121 and provided to the gNB 122 via the inside of the 3GPP network, data 2 provided to the UE 123 via air from the gNB 122, and data 3 provided to the TSN Node2 112 from the DS-TT of the UE 123 in FIGS. 3, 4 and 5 described above.

Therefore, the stream talker may be the TSN Node0 111 in FIGS. 3, 4 and 5 described above, and the data 1 transmitted through the Link1 will be the data outputted from the talker.

The output of the TSN Node0 111 arrives at the NW-TT/UPF 121, which is the input port of the TSN Node1, after undergoing a certain propagation delay of the Link1. The CNC 230 may provide arrival time pattern information of this traffic to the TSN AF 228 by using stream information.

The traffic pattern that is periodically outputted from TSN Node0 111 and is inputted to the NW-TT/UPF 121 after a certain propagation delay of the Link1 may be transmitted periodically based on the TSN GM 713 as illustrated in (1) of FIG. 7. Exemplarily illustrated in FIG. 7 is a case where seven packets (data burst 1, data burst 2, data burst 3, data burst 4, data burst 5, data burst 6, and data burst 7) are periodically transmitted based on the TSN GM 713.

As described above, the TSN AF 228 may deliver this information to the SMF 224. The SMF 224 may convert it from the TSN GM clock basis to the 5G GM clock basis. In addition, the SMF 224 may reflect a core network packet delay budget (CN PDB), which is an estimated delay time from the NW-TT/UPF 121 to the gNB 122, in information converted based on the 5G GM clock. Thereafter, the SMF 224 may convert the time when a specific burst stream arrives at the gNB 122, based on the converted information, as the TSCAI, and provide it to the gNB 122 through the QoS configuration process. An estimated traffic pattern arriving at the gNB 122, based on the TSCAI, that is, inputted to the gNB 122, may be as shown in (1A).

Because of scheduling radio resources with reference to the TSCAI, the gNB 122 may wirelessly transmit messages arriving at the gNB according to the period expressed by the 5G GM clock to the UE 123. Because there may be errors in the process of converting to the TSCAI by reflecting a difference between the 5G GM clock and the TSN GM clock, traffic that actually arrives at the gNB may have some error 731 as illustrated in (1'). Therefore, in FIGS. 3 to 5 described above, the input to the gNB 122 is exemplified as (1') rather than (1A).

If two or more messages are in a gNB buffer (not shown) when sending actual traffic arriving at the buffer according to the radio resource scheduling period, the most recent traffic may be transmitted. This is because a message whose delay time has elapsed has no meaning to be transmitted. If there is no message to be transmitted in the gNB buffer, the gNB cannot transmit traffic. By comparing the periodicity of (1) and the periodicity of (1A), if the periodicity of (1A) is shorter, the former case, that is, a phenomenon of transmitting the most recent traffic occurs, and if the periodicity of (1A) is longer, the latter case, that is, a phenomenon of transmitting no traffic may occur. Here, (1) may be determined by the TSN Node0. Because this is expressed based on the TSN GM clock, the SMF 224 may convert it based on the 5G GM clock to create the TSCAI, which is shown in (1A).

In addition, the actual traffic pattern that (1) enters as the input of the gNB (122) through the UPF 121 is (1'). However, when reporting the arrival time pattern information of this traffic to the gNB 122, it is notified with the TSCAI, so it can be informed as shown in (1A). Note that because time information is different as above, that is, because TSN nodes operate based on the TSN GM clock and 5G entities operate based on the 5G GM clock, each expression is different. In addition, nodes capable of simultaneously using the 5G GM clock and the TSN GM clock in the 5G network may be the NW-TT/UPF 121 and the DS-TT/UE 123.

In this case, the gNB 122, which is the base station, performs scheduling of radio (air) resources in accordance with information delivered as the TSCAI, thus operating according to (1A). However, because traffic actually entering the gNB buffer follows (1'), a problem may occur.

The above phenomenon will be described with reference to the transmission process from the gNB 122 to the UE 122, that is, the operation in which data of (1') is inputted as shown in (2). Reference numeral 741 indicates that data burst 1 can be transmitted from the gNB 122 to the UE 122. Reference numeral 742 indicates that data burst 2 can be transmitted from the gNB 122 to the UE 122. Also, reference numeral 743 indicates that data burst 3 can be transmitted from the gNB 122 to the UE 122. However, reference numeral 744 indicates a state in which data burst 4 should be transmitted from the gNB 122 to the UE 123, but data burst 5 has been already received due to different scheduling times from the gNB 122 to the UE 123. In this case, as described above, the gNB 122 transmits data burst 5, not data burst 4, to the UE 123.

As a result, data burst 1, data burst 2, data burst 3, and data burst 5 may be transmitted to the input of the TSN listener receiving the stream. That is, the TSN Node2 112 may be in a state 751 of failing to receive data burst 4.

That is, the traffic pattern transmitted by the gNB 122 and arriving at the UE 123 is actually as shown in (2). The input of the TSN Node2 112, which is the final TSN stream listener, through the DS-TT/UE 122 includes the residence time of the DS-TT/UE 122, and traffic transmitted according to the output of the TSN Node1 220 informed by the CNC 230 may be traffic that arrives after undergoing a certain propagation delay of the Link2. Therefore, its pattern is as shown in (3). The listener, TSN Node2 112, expects that a message arrives according to the E2E latency requirement and at a certain interval (periodicity based on the TSN GM clock). However, in the pattern of (3), the message corresponding to data burst 4 may be lost.

In this case, according to the disclosure, if the message corresponding to data burst 5 is received within the survival time 752, a normal operation may be performed in terms of application.

Figure 8:
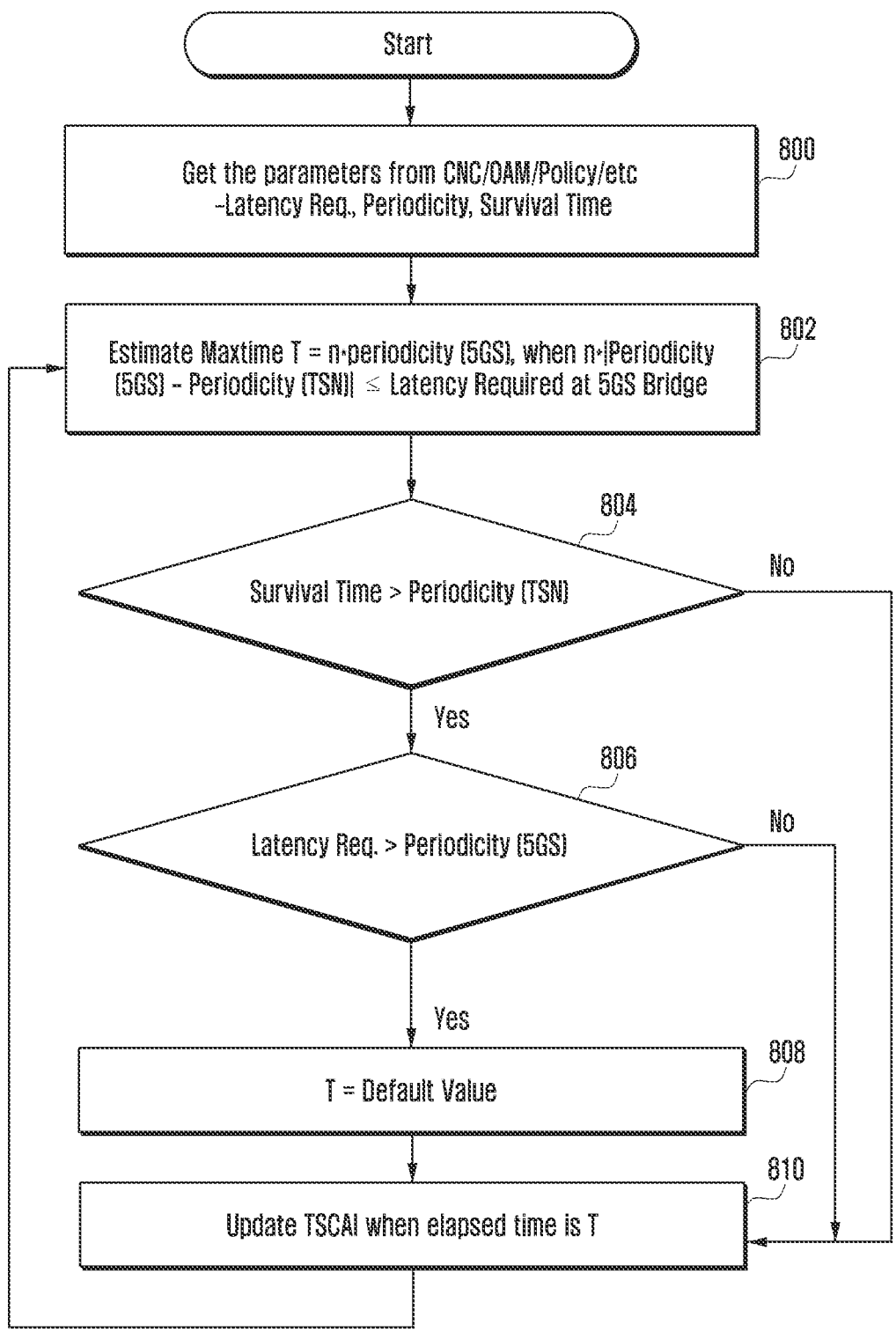
FIG. 8 is a control flow diagram in case of TSCAI update in consideration of a survival time when a latency requirement is greater than or equal to periodicity according to the disclosure.

FIG. 8 is a control flow diagram in case of TSCAI update in consideration of a survival time when a latency requirement is greater than or equal to periodicity according to the disclosure.

The operation of FIG. 8 may be performed in each node as in the following case. For example, in case of FIG. 3 in which the SMF 224 changes the TSCAI from the TSN GM clock basis to the 5G GM clock basis, the SMF 224 may be the subject of the operation. Therefore, in this case, the operation may be performed in the SMF 224.

Also, in case that the TSN AF 228 changes the TSCAI from the TSN GM clock basis to the 5G GM clock basis as shown in FIG. 4, the TSN AF 228 may be the subject of the operation. Therefore, in case of FIG. 4 embodiment, the control flow of FIG. 8 may be performed in the TSN AF 228.

In FIG. 3 or FIG. 4, if the UFP 121 reports the difference between the 5G GM clock and the TSN GM clock to the SMF 224 in the form of a transfer ratio (rateRatio) as a report on the session level, and if the SMF 224 or the TSN AF 228 operates in such a way that unconditionally updates the TSCAI when receiving this information, the UPF 121 may be the subject.

From this point of view, the following operations of FIG. 8 will be described. Also, in the following description, the case of FIG. 3 will be assumed for convenience of description. That is, the description will be made on the assumption that the SMF 224 is the subject.

At step 800, the SMF 224 may receive parameters such as latency requirements, periodicity, and survival time. These parameters may be received from the CNC 230, may be received from an operation administration and management (OAM) server operating as a network management server, or may be received as a policy rule through the PCF 227.

At step 802, the SMF 224 may determine an interval time T for performing the next TSCAI update. At step 802, the SMF 224 may express the periodicity (periodicity (5GS)) based on the 5GS GM clock changed from the periodicity (periodicity (TSN)) originally based on the TSN clock. At this time, an cumulative error occurring in the 5G system may be calculated as n*|Periodicity (5GS)−Periodicity (TSN)|. When this cumulative error exceeds the latency requirements, an issue begin to arise. Therefore, the SMF 224 may determine the maximum value of n at which the issue does not occur, and based on this, define the value of T as n*Periodicity (5GS). Here, n may be the number of times periodicity (5GS) is used in the 5G network. In order to prevent an issue occurrence, the SMF 224 must update the TSCAI again before the time configured as the T value elapses. Here, n corresponds to the number of times periodicity (5GS) is used in the 5G network, so it may be a natural number value.

At step 804, if the survival time is greater than or equal to the periodicity (TSN), the SMF 224 may consider that no issue occurs in terms of application even if at least one of consecutive messages is not transmitted. Therefore, the SMF 224 proceeds to step 806 to perform an additional check. If the survival time is less than the periodicity (TSN), the SMF 224 may proceed directly to step 810.

As described above, if the latency requirements are greater than or equal to the periodicity (5GS) at step 806, the SMF 224 may consider that the latency requirements are satisfied even if one period disagrees when the gNB performs scheduling. That is, if the latency requirements are greater than or equal to the periodicity (5GS), the loss of consecutive messages may occur. However, because step 804 has been already passed, it can be seen that the loss of one message is not an issue due to the survival time in terms of application. Therefore, it can be seen that even if the SMF 224 does not update the TSCAI at all, a problem does not occur in terms of application.

After that, at step 808, the SMF 224 does not update the TSCAI at all, but no problem occurs in terms of application. Therefore, the SMF 224 does not immediately update the TSCAI, configures a default value, which is the value of a TSCAI update period, to the next TSCAI update time T, and then may proceed to step 810. Through this, the SMF 224 can reduce a signaling load caused by the TSCAI update. Note that in FIG. 8 the TSCAI update operation of the configured T time unit is omitted. If the preconfigured time T arrives, the SMF 224 may perform a TSCAI update.

At step 810, the SMF 224 performs the update of time-sensitive communications assistance information (TSCAI) before an elapse of T from the current time, and returns to step 802.

As described above, based on the definition of the survival time, even if a problem occurs due to a TSCAI error, the listener application of the TSN network may operate normally in case of receiving data within the survival time. If this survival time is greater than or equal to the periodicity, it means that one failure of message transmission is acceptable in terms of application. Ideally, the periodicity (TSN), which is periodicity based on the TSN GM clock, and the periodicity (5GS), which is periodicity based on the 5GS GM clock, should be the same, but there may be an error in a process of calculating the frequency offset or rateRatio or in a process of converting the periodicity (TSN) into the periodicity (5GS), and if such errors accumulate, one packet or one traffic burst may be lost. If the survival time is greater than or equal to the periodicity required by the TSN, it may mean, in terms of application, that a normal operation can be performed in case of receiving the next message is received even if one message is not received. Therefore, it can be seen that the loss due to error accumulation is allowed.

Next, if the latency requirements are greater than or equal to periodicity, it means, in terms of scheduling, that traffic transmitted after one periodicity of the 5G network is acceptable. Therefore, a problem occurs when the result of accumulated errors exceeds the latency requirements. However, because packets/messages are transmitted before that by radio resources scheduled for the next period, the same effect as the error is reduced again occurs as a result, and the latency requirements can be satisfied without updating the TSCAI. In an actual implementation, it is possible to update the TSCAI with a default TSCAI update cycle within a range that does not cause a signaling load.

If the above-described SMF 224 or TSN AF 228 of FIGS. 3 to 5 operates as described above when updating the TSCAI, it is possible to prevent an increase in the signaling load even if the latency requirements are low. Also, in FIGS. 3 and 4, the SMF 224 or the TSN AF 228 may update the TSCAI whenever receiving the report of the UPF 121. In this case, if the UPF 121 operates in accordance with the principle of FIG. 8, it is possible to prevent an increase in the signaling load even if the latency requirements are low.

Figure 9:
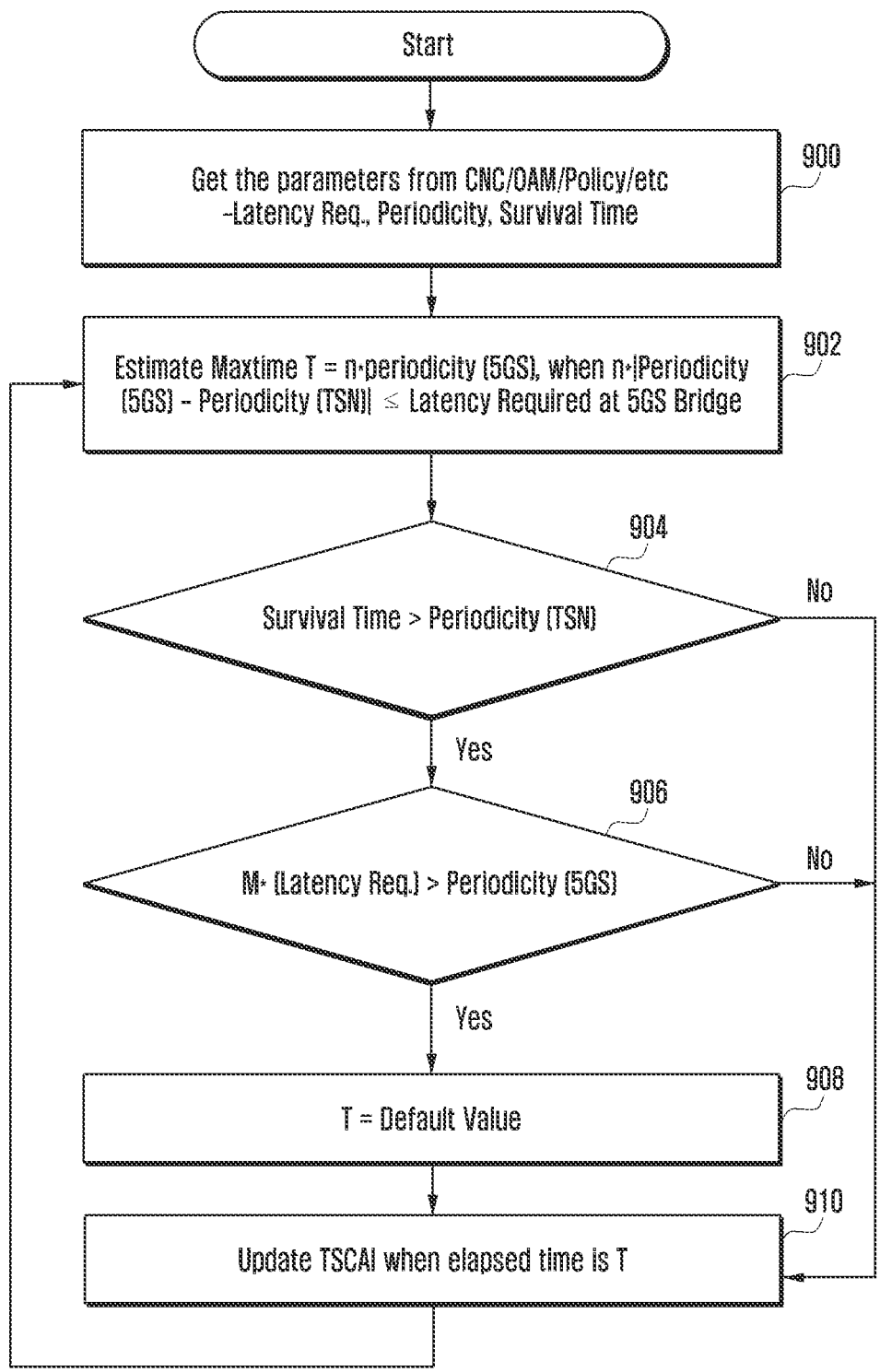
FIG. 9 is a control flow diagram in case of TSCAI update in consideration of a survival time when a latency requirement is less than periodicity according to the disclosure.

FIG. 9 is a control flow diagram in case of TSCAI update in consideration of a survival time when a latency requirement is less than periodicity according to the disclosure.

A subject performing the operation of FIG. 9 is as follows. In case that the SMF 224 changes the TSCAI from the TSN GM clock basis to the 5G GM clock basis as shown in FIG. 3, the SMF 224 may be the subject.

Also, in case that the TSN AF 228 changes the TSCAI from the TSN GM clock basis to the 5G GM clock basis as shown in FIG. 4, the TSN AF 228 may be the subject. In FIG. 3 or FIG. 4, if the UFP 121 reports the difference between the 5G GM clock and the TSN GM clock to the SMF 224 in the form of a transfer ratio (rateRatio) as a report on the session level, and if the SMF 224 or the TSN AF 228 operates in such a way that unconditionally updates the TSCAI when receiving this information, the UPF 121 may be the subject.

From this point of view, the following operations of FIG. 9 will be described. Also, in the following description, the case of FIG. 3 will be assumed for convenience of description. That is, the description will be made on the assumption that the SMF 224 is the subject.

At step 900, the SMF 224 may receive parameters such as latency requirements, periodicity, and survival time. These parameters may be received from the CNC 230, may be received from an operation administration and management (OAM) server operating as a network management server, or may be received as a policy rule through the PCF 227.

At step 902, the SMF 224 may determine an interval time T for performing the next TSCAI update. At step 902, the SMF 224 may express the periodicity (periodicity (5GS)) based on the 5GS GM clock changed from the periodicity (periodicity (TSN)) originally based on the TSN clock. At this time, an cumulative error occurring in the 5G system may be calculated as n*|Periodicity (5GS)−Periodicity (TSN)|. When this cumulative error exceeds the latency requirements, an issue begin to arise. Therefore, the SMF 224 may determine the maximum value of n at which the issue does not occur, and based on this, define the value of T as n*Periodicity (5GS). In order to prevent an issue occurrence, the SMF 224 must update the TSCAI again before the time configured as the T value elapses. Here, n is a natural number value.

At step 904, if the survival time is greater than or equal to the periodicity (TSN), the SMF 224 may consider that no issue occurs in terms of application even if at least one of consecutive messages is not transmitted. Therefore, the SMF 224 proceeds to step 906 to perform an additional check.

Otherwise, that is, if the survival time is less than the periodicity (TSN), the SMF 224 may proceed directly to step 910.

As described above, if m times the latency requirements are greater than or equal to the periodicity (5GS) at step 906, the SMF 224 may consider that consider that the latency requirements are satisfied even if one period disagrees when the gNB invests m times the resources and performs scheduling with 1/m*Periodicity (5GS). Here, the maximum value of m is configured by the OAM or may be selected by the SMF 224 within a value range determined through the PCF 227.

To support TSN stream or TSN traffic requiring a very short latency, the 3GPP network may allocate more resources than expected. In this way, allocating more resources for service guarantee is called redundancy. Although there may be various schemes of providing this redundancy, a method for more frequently scheduling traffic may be used in an embodiment of the disclosure. For example, although the gNB originally allocates radio resources for each periodicity (5GS) to process traffic, it can also process traffic by allocating twice the resources, that is, by allocating radio resources for every ½*Periodicity (5GS). In order to represent this amount of redundancy, m may be configured as a redundancy factor. Therefore, the gNB 122 may define providing m times the radio scheduling based on the redundancy factor m. Using this, the gNB 122 may provide radio resource scheduling for every 1/m*Periodicity (5GS). When radio resources are allocated as such, the latency requirements can be satisfied in the same way as described in FIG. 8.

Meanwhile, conditions at step 906 in addition to step 904 described above may cause the loss of consecutive messages. However, because step 904 has been already passed, it can be seen that the loss of one message is not an issue due to the survival time in terms of application. Therefore, it can be seen that even if the SMF 224 does not update the current TSCAI, a problem does not occur in terms of application.

At step 908, the SMF 224 does not update the current TSCAI, but no problem occurs in terms of application. Therefore, the SMF 224 configures a default value, which is the value of an originally configured TSCAI update period, to the next TSCAI update time T, and then may proceed to step 902. Through this, the SMF 224 can reduce a signaling load caused by the TSCAI update. Note that in FIG. 9 the TSCAI update operation of the configured T time unit is omitted. If the preconfigured time T arrives, the SMF 224 may perform a TSCAI update.

At step 910, the SMF 224 performs the update of TSCAI before an elapse of T from the current time, and returns to step 902.

In FIG. 9, as in FIG. 8 described above, based on the definition of the survival time, even if a problem occurs due to a TSCAI error, the application may operate normally in case of receiving data within the survival time. If this survival time is greater than or equal to the periodicity, it means that one failure of message transmission is acceptable in terms of application. Ideally, the periodicity (TSN), which is periodicity based on the TSN GM clock, and the periodicity (5GS), which is periodicity based on the 5GS GM clock, should be the same, but there may be an error in a process of calculating the frequency offset or rateRatio or in a process of converting the periodicity (TSN) into the periodicity (5GS), and if such errors accumulate, one packet or one traffic burst may be lost. If the survival time is greater than or equal to the periodicity required by the TSN, it may mean, in terms of application, that a normal operation can be performed in case of receiving the next message is received even if one message is not received. Therefore, it can be seen that the loss due to error accumulation is allowed.

For example, if an integer m greater than or equal to 2 is determined to satisfy m>(Periodicity (5GS)/(Latency requirements)), and if the latency requirements is 1/m*Periodicity (5GS) or more, it means, in terms of scheduling, that traffic transmitted after 1/m*Periodicity (5GS) is also acceptable. A problem occurs when the result of accumulated errors exceeds the latency requirements. However, because packets/messages are transmitted before that by radio resources scheduled for the next period, the same effect as the error is reduced again occurs as a result, and the latency requirements can be satisfied without updating the TSCAI. In an actual implementation, it is possible to update the TSCAI with a default TSCAI update cycle within a range that does not cause a signaling load.

If in FIGS. 3 to 5 the SMF 224 or the TSN AF 228 complies with the principle of FIG. 9 when updating the TSCAI, it is possible to prevent an increase in the signaling load even if the latency requirements are low. Also, in FIGS. 3 and 4, the SMF 224 or the TSN AF 228 may update the TSCAI whenever receiving the report of the UPF 121. In this case, if the UPF 121 operates in accordance with the principle of FIG. 9, it is possible to prevent an increase in the signaling load even if the latency requirements are low.

Figure 10:
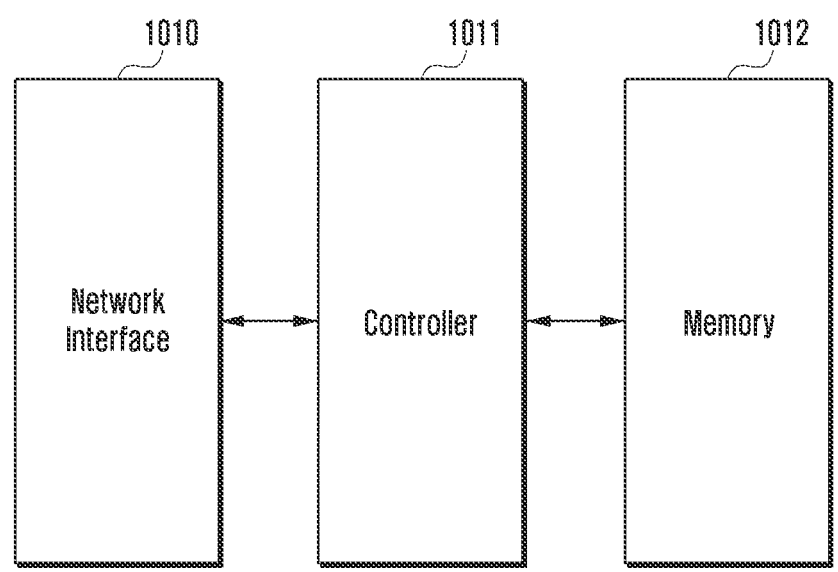
FIG. 10 is a functional block diagram of an NF of a wireless communication network according to an embodiment of the disclosure.

FIG. 10 is a functional block diagram of an NF of a wireless communication network according to an embodiment of the disclosure.

With reference to FIG. 10, a network interface 1010 may perform communication with other network entities of a mobile communication core network and/or at least one TSN node. For example, in case that the NF is the RAN 122, it may perform communication with the UPF 121, the AMF 223, and the like. In another example, in case that the NF is the UPF 121, it may perform communication with the RAN 122, the SMF 224, and the like. In still another example, in case that the NF is the TSN AF 228, it may communicate with the CNC 230 of the TSN and/or at least one node of the TSN system and simultaneously communicate with the NEF 229 and/or the PCF 227. Similarly, in case that the NF is one specific network entity, the network interface 1010 may communicate with another entity of the mobile communication network and/or at least one node of the TSN system. Therefore, the network interface 1010 according to the disclosure may have a function of NW-TT in a specific case, for example, in case of being included in the UPF 326.

A controller 1011 may be implemented as at least one processor and/or program for performing the operations of the NF. For example, in case that the NF is the UPF 326, the controller 1011 may perform the above-described operations of the UFF 326. In another example, in case that the NF is the TSN AF 228, it may perform the above-described operations of the TSN AF 228. In case of any other network entity, it may perform control necessary for the above-described operations.

A memory 1012 may store a program and various kinds of control information required by the controller 1011 and may also store each information described in the disclosure.

In addition to the above-described components, the NF may further include various interfaces for connection with an operator. In the disclosure, there is no particular limitation on such additional components.

Figure 11:
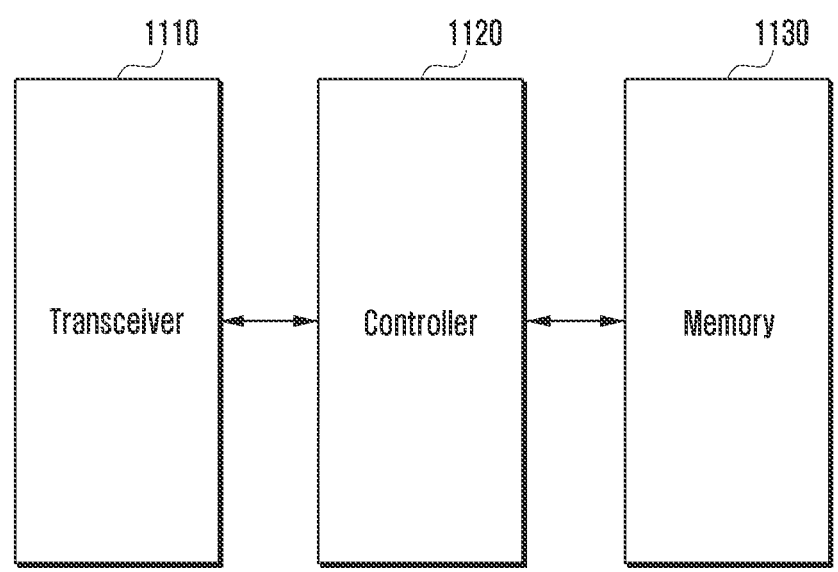
FIG. 11 is a functional block diagram of a UE according to various embodiments of the disclosure.

FIG. 11 is a functional block diagram of a UE according to various embodiments of the disclosure.

With reference to FIG. 11, the UE 123 may include a transceiver 1110, a controller 1120, and a memory 1130. The UE 123 may further include more components depending on an implementation scheme. For example, various additional devices such as a display for a user interface, an input unit, and a sensor may be further included. In the disclosure, there is no limitation on such additional components.

The transceiver 1110 may be connected to the gNB 122 through a wireless channel based on each of the embodiments described with reference to FIGS. 1 to 9, and it may perform transmission/reception of signals and/or messages with the gNB 122. In case that the UE 123 communicates with the 5G network, the transceiver 1110 may be a device capable of transmission/reception with the 5G communication network. In addition, the transceiver 1110 may include a communication processor as necessary. In case that the transceiver 1110 does not include a communication processor, all signals and/or messages may be processed by the controller.

In addition, according to the disclosure, the transceiver 1110 may perform communication with at least one node of the TSN system. In this case, the at least one node of the TSN system may be one of a talker and/or a listener or another bridge as described above. Therefore, the transceiver 1110 according to the disclosure may include both a constitution for communicating with the mobile communication system in a wireless format and a constitution of DS-TT.

The controller 1120 may control the basic operation of the UE 123, and it may control reception, delivery, transmission, and storage of the messages described above.

The memory 1130 may store various data necessary for the control of the UE 123, and it may have a region for storing a message received from the gNB 122 and/or a specific NF of the core network to communicate using a network slice.

While the disclosure has been particularly shown and described with reference to exemplary embodiments thereof, it will be understood by those skilled in the art that various changes in form and details may be made therein without departing from the scope of the subject matter as defined by the appended claims.

INDUSTRIAL APPLICABILITY

The disclosure is applicable in case that a mobile communication system operates as one node of a TSN system.

The invention claimed is:

1. A method performed by a session management function (SMF), in a wireless communication system supporting a time sensitive network (TSN), the method comprising:
receiving, from a TSN application function (AF), parameters including at least one of a first periodicity or a first survival time;
receiving, from a user plane function (UPF), time information between a first clock associated with the TSN and a second clock associated with a fifth generation (5G) system, the time information including a time offset and a rateRatio between the first clock associated with the TSN and the second clock associated with the 5G system;
converting the first survival time included in the parameters to a second survival time to be included in time sensitive communications assistance information (TSCAI), based on the rateRatio;
determining the TSCAI, based on the parameters and the time information; and
transmitting, to a base station, the TSCAI.

2. The method of claim 1, the determining further comprising:
converting the first periodicity included in the parameters to a second periodicity to be included in the TSCAI, based on the rateRatio.

3. The method of claim 1, the transmitting further comprising:
performing a protocol data unit (PDU) session modification procedure in order to transmit the determined TSCAI to the base station.

4. The method of claim 1, wherein a survival time is a time period that an application is in normality without receiving any message.

5. A session management function (SMF) in a wireless communication system supporting a time sensitive network (TSN), the SMF comprising:
a network interface; and
a controller configured to:
receive, from a TSN application function (AF), parameters including at least one of a first periodicity or a first survival time,
receive, from a user plane function (UPF), time information between a first clock associated with the TSN and a second clock associated with a fifth generation (5G) system, the time information including a time offset and a rateRatio between the first clock associated with the TSN and the second clock associated with the 5G system,
convert the first survival time included in the parameters to a second survival time to be included in time sensitive communications assistance information (TSCAI), based on the rateRatio,
determine the TSCAI based on the parameters and the time information, and
transmit, to a base station, the TSCAI.

6. The SMF of claim 5, wherein the controller is further configured to:
convert the first periodicity included in the parameters to a second periodicity to be included in the TSCAI, based on the rateRatio.

7. The SMF of claim 5, wherein the controller is further configured to:
perform a protocol data unit (PDU) session modification procedure in order to transmit the determined TSCAI to the base station.

8. The SMF of claim 5, wherein a survival time is a time period that an application is in normality without receiving any message.

* * * * *